United States Patent
Gatta et al.

(10) Patent No.: US 10,152,851 B2
(45) Date of Patent: Dec. 11, 2018

(54) NOTIFICATION ARTIFACT DISPLAY

(71) Applicant: Microsoft Technology Licensing, LLC, Redmond, WA (US)

(72) Inventors: Srinivas Raghu Gatta, Redmond, WA (US); Richard Fang, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/364,091

(22) Filed: Nov. 29, 2016

(65) Prior Publication Data

US 2018/0150996 A1    May 31, 2018

(51) Int. Cl.
G02B 27/01 (2006.01)
G08B 5/22 (2006.01)
G06F 3/01 (2006.01)

(52) U.S. Cl.
CPC ......... *G08B 5/225* (2013.01); *G02B 27/0172* (2013.01); *G06F 3/012* (2013.01); *G06F 3/013* (2013.01); *G02B 2027/014* (2013.01); *G02B 2027/0141* (2013.01); *G02B 2027/0178* (2013.01)

(58) Field of Classification Search
CPC .............................. G06T 19/006; G02B 27/01
See application file for complete search history.

(56) References Cited

U.S. PATENT DOCUMENTS

| | | | |
|---|---|---|---|
| 8,570,320 B2 | 10/2013 | Izadi et al. | |
| 8,589,822 B2 | 11/2013 | Bell et al. | |
| 9,035,878 B1 | 5/2015 | Wheeler | |
| 2002/0140666 A1 | 10/2002 | Bradski | |
| 2007/0242131 A1 | 10/2007 | Sanz-Pastor et al. | |
| 2011/0050687 A1 | 3/2011 | Alyshev et al. | |
| 2011/0093888 A1 | 4/2011 | Araki et al. | |
| 2012/0154557 A1* | 6/2012 | Perez | H04N 21/25891 348/53 |
| 2012/0249741 A1* | 10/2012 | Maciocci | G06F 3/011 348/46 |
| 2013/0332871 A1 | 12/2013 | Bucur et al. | |

(Continued)

FOREIGN PATENT DOCUMENTS

WO    2013128078 A1    9/2013

OTHER PUBLICATIONS

Hickey, et al., "Interaction with Services Using an Augmented Reality User Interface", In Proceedings of the 15th international conference on Human-computer interaction with mobile devices and services, Aug. 29, 2013, pp. 456-459.

*Primary Examiner* — Said Broome

(74) *Attorney, Agent, or Firm* — Alleman Hall Creasman & Tuttle LLP

(57) ABSTRACT

A head-mounted display device may display a notification artifact for another display device. Using image data of a physical environment, a three dimensional model of the environment may be generated. Locations of the head-mounted display device and the other display device within the model may be determined. Notification data for the other display device may be received. Based on the location of the other display device relative to the head-mounted display device, the notification artifact for the other display device may be displayed within the physical environment.

18 Claims, 10 Drawing Sheets

(56) References Cited

U.S. PATENT DOCUMENTS

| | | |
|---|---|---|
| 2013/0335301 A1 | 12/2013 | Wong et al. |
| 2015/0002434 A1 | 1/2015 | Tsukahara et al. |
| 2015/0091906 A1 | 4/2015 | Dishno |
| 2015/0331240 A1 | 11/2015 | Poulos et al. |
| 2016/0004306 A1 | 1/2016 | Maltz |
| 2016/0034147 A1 | 2/2016 | Chhabra et al. |

* cited by examiner

NOTIFICATION ARTIFACT DISPLAY

BACKGROUND

Computing devices may notify users of various types of information and events, such as text messages, weather alerts, incoming phone calls, calendar reminders, etc. Such notifications may be provided via one or more of audio, visual, haptic, or other methods.

SUMMARY

A head-mounted display device and methods for displaying a notification artifact indicating a notification for another display device are disclosed herein. In one example, image data of a physical environment is received and a three dimensional model of at least a portion of the physical environment is generated using the image data. A location of a head-mounted display device within the three dimensional model is determined. A location of another display device also is determined.

Notification data indicating that a notification issued for at least the other display device is received. Based on at least the location of the other display device relative to the head-mounted display device, the notification artifact for the other display device is displayed via the head-mounted display device within the physical environment.

This Summary is provided to introduce a selection of concepts in a simplified form that are further described below in the Detailed Description. This Summary is not intended to identify key features or essential features on the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A person may have two or more computing devices with which she interacts at different times or at the same time. Examples of such computing devices may include mobile communication devices such as smartphones, wearable computing devices, desktop computers, laptop computers, tablet computers, and other internetworked/connected computing devices (such as a home thermostat, a garage door opener, and other smart home devices). Each of these devices may receive and/or issue various notifications that relate to information to be communicated to the user. Examples of such information include incoming communications, such as receipt of text messages or incoming phone or video calls, calendar reminders, weather alerts, device status alerts, etc. In some examples, such notifications may be communicated via a display of the device.

In some situations where a user's computing device generates a notification, the user may not become aware of the notification. For example, a user may be in his living room while his smartphone is on the kitchen counter on the other side of his home. A text message notification displayed on the smartphone may not be perceived by the user. In another example, a user may be focused on a movie being displayed via a head-mounted display device. Though the user's tablet computer may be on a desk next to the user, because the user's attention is devoted to the movie, the user may not notice that a weather alert is being displayed on the tablet computer.

The present descriptions relate to using a head-mounted display (HMD) device to display a notification artifact that alerts a user to a notification for another display device. In some examples, the HMD device may comprise an augmented reality display device. As used herein, an augmented reality display device includes an at least partially see-through display configured to visually augment a view of a real world physical environment through the display. As described in more detail below, the examples of the present disclosure include use cases comprising an augmented reality HMD device.

In other examples, the principles of the present disclosure may be utilized with an HMD device that comprises a virtual reality display device. As used herein, a virtual reality display device provides a virtual reality environment in which a user views a fully immersive environment of virtual content in which the user has no direct view of her surrounding real world physical environment. In some examples of virtual reality devices, sensors may capture image data from the physical environment and images corresponding to the physical environment may be displayed to the user. Other virtual content may be blended and displayed with the images of the user's real world environment.

Figure 1:
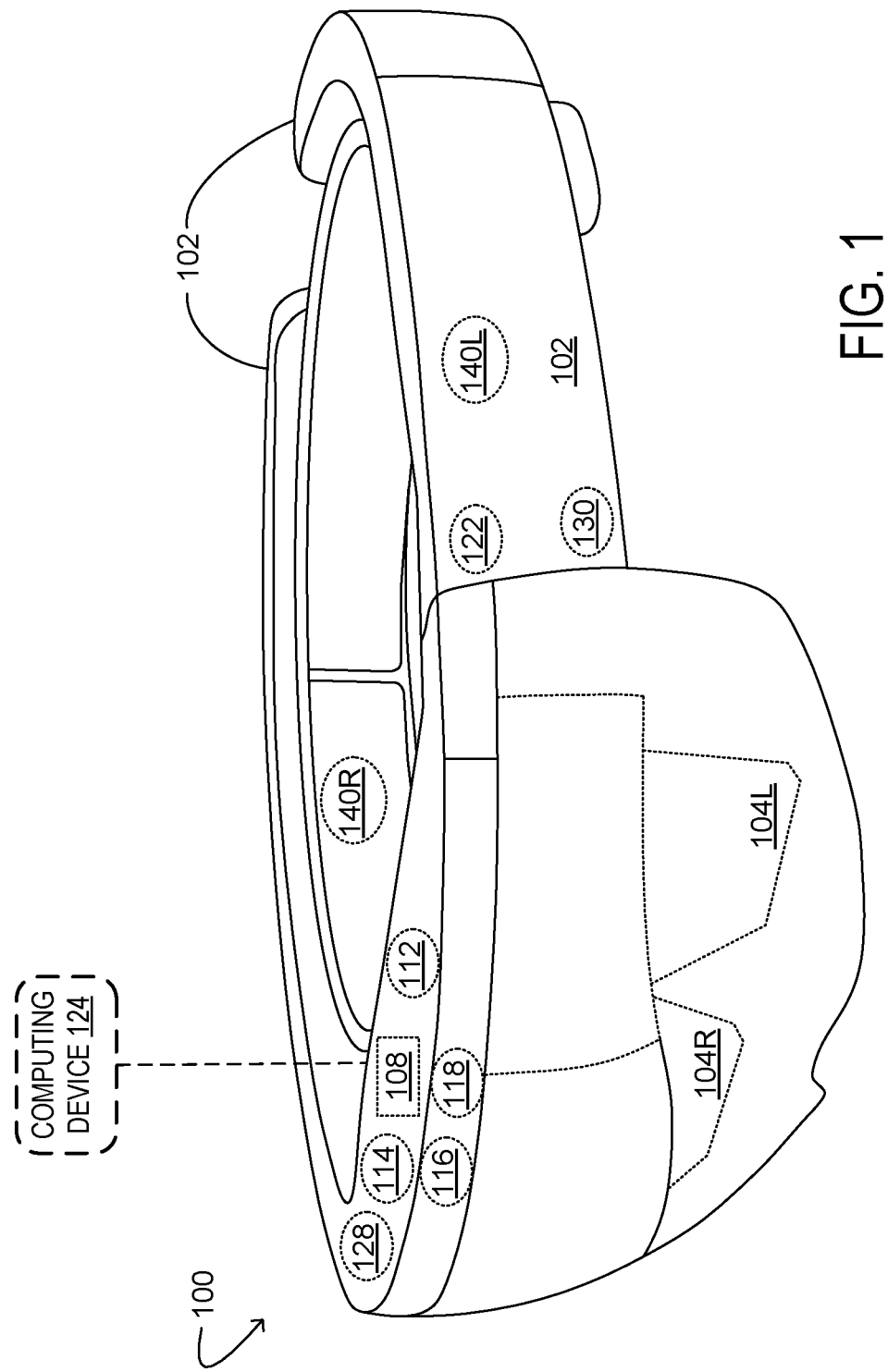
FIG. 1 shows a head-mounted display device for displaying a notification artifact indicating a notification for another display device according to an example of the present description.

Turning to FIG. 1, an example of an HMD device 100 that may be worn by a user and may provide an augmented reality experience according to an example of the present disclosure is illustrated. In other examples, an augmented reality HMD device may take any other suitable form in which an at least partially see-through display is supported in front of a viewer's eye or eyes. In some examples, an HMD device may comprise a thin lens placed directly on the surface of a user's eye.

In the example of FIG. 1, the HMD device 100 includes a frame 102 that wraps around the head of a user to position at least partially see-through right display panel 104R and at least partially see-through left display panel 104L close to the user's eyes. The frame supports additional stereoscopic, see-through display componentry as described in more detail below. As noted above, HMD device 100 may be used in augmented reality applications where virtual display imagery is mixed with real-world imagery.

In this example HMD device 100 includes separate right and left display panels, 104R and 104L, which may be wholly or partially transparent from the perspective of the user, to give the user a clear view of his or her surroundings. A processor 108 is operatively coupled to the display panels 104R and 104L and to other display system componentry. The processor 108 includes logic and associated computer memory configured to provide image signals to the display panels 104R and 104L to receive sensory signals, and to enact various control processes described herein.

The display panels 104R and 104L facilitate the delivery of holographic images to the eyes of a wearer of the HMD device 100. In this manner, the display panels 104R and 104L may be configured to visually augment an appearance of a real-world, three dimensional physical environment to a wearer viewing the physical environment through the panels. For example and as described in more detail below, the display panels 104R and 104L may display within the physical environment a notification artifact indicating that a notification has issued for another display device.

Any suitable display technology and configuration may be used to display images via the at least partially see-through display panels 104R and 104L. For example, the panels may be configured to enable a wearer of the HMD device 100 to view a physical, real-world object in the physical environment through one or more partially transparent pixels that are displaying a virtual object representation. For example, the panels may include image-producing elements such as, for example, a see-through Organic Light-Emitting Diode (OLED) display.

As another example, the HMD device 100 may include a light modulator on an edge of the panels. In this example, the panels may serve as a light guide for delivering light from the light modulator to the eyes of a wearer. In other examples, the display panels may utilize a liquid crystal on silicon (LCOS) display. Additionally, while the example of FIG. 1 shows separate right and left display panels 104R and 104L, a single display panel extending over both eyes may be used in other examples.

The HMD device 100 may also include various sensors and related systems to provide information to the processor 108. Such sensors may include, but are not limited to, one or more inward facing image sensors 112, 114, one or more outward facing image sensors 116, 118, an inertial measurement unit (IMU) 122, and one or more microphones 130. The HMD device 100 also may include stereo loudspeakers 104R and 140L to broadcast audio to the wearer. The one or more inward facing image sensors 112, 114 may be configured to acquire, image data in the form of gaze tracking data from a wearer's eyes (e.g., sensor 112 may acquire image data from one of the wearer's eyes, and sensor 114 may acquire image data from the other of the wearer's eye).

The processor 108 may execute instructions to determine gaze directions of each of a wearer's eyes in any suitable manner based on the information received from the image sensors 112, 114. For example, one or more light sources, such as infrared light sources, may be configured to cause a glint of light to reflect from the cornea of each eye of a wearer. The one or more image sensors 112, 114 may be configured to capture an image of the wearer's eyes. Images of the glints and of the pupils as determined from image data gathered from the image sensors may be used to determine an optical axis of each eye. Using this information, the processor 108 may execute instructions to determine a direction in which the wearer is gazing.

In other implementations, a different type of gaze sensor may be employed in the HMD device 100 to measure one or more gaze parameters of the user's eyes. Examples of gaze parameters measured by one or more gaze sensors may include an eye gaze direction or gaze vector, head orientation eye gaze velocity, eye gaze acceleration, change in angle of eye gaze direction, and/or any other suitable tracking information.

The one or more outward facing image sensors 116, 118 may be configured to capture and/or measure physical environment attributes of the physical environment in which the HMD device 100 is located. In one example, image sensor 116 may include a visible-light camera configured to collect a visible-light image of a physical space. The image sensor 118 may include a depth camera configured to collect a depth image of a physical space. More particularly, in one example the depth camera is an infrared time-of-flight depth camera. In another example, the depth camera is an infrared structured light depth camera.

Data from the outward facing image sensors 116, 118 may be used by the processor 108 to generate and/or update a three-dimensional (3D) model of a physical environment. Data from the outward facing image sensors 116, 118 may be used by the processor 108 to identify surfaces of the physical space and/or measure one or more surface parameters of the physical space. The processor 108 may execute instructions to generate/update 3D models and identify surfaces of the physical space in any suitable manner. In one example, depth maps derived from depth data provided by the depth camera of image sensor 118 may be used to generate/update 3D models and identify surfaces of the physical space. In some examples, images captured by the outward facing image sensors 116, 118 may be used to build and update a 3D model of the environment as the wearer of the HMD device moves about the environment.

In some examples data from the outward facing image sensors 116, 118 may be used by the processor 108 to determine the location and orientation of other physical objects in the physical environment, such as another display device. Data from the outward facing image sensors 116, 118 also may be used by the processor 108 to detect movements within a field of view of the HMD device 100, such as gesture-based inputs or other movements performed by a wearer or by a person or physical object within the field of view. In one example, data from the outward facing image sensors 116, 118 may be used to detect user input performed by the wearer of the HMD device 100, such as a gesture (e.g., a pinching of fingers, closing of a fist, pointing with a finger or hand, etc.), that indicates an action to be taken, election of a hologram or other virtual object displayed via the display device, or other command.

Data from the outward facing image sensors 116, 118 also may be used by the processor 108 to determine direction/location and orientation data (e.g., from imaging environmental features) that enables position/motion tracking of the HMD device 100 in the real world physical environment. In some examples, such position/motion tracking may be performed with respect to a real world object, such as another display device. In some examples, such position/motion tracking may be used to track the position of the HMD device in relation to the 3D model of the environment. Data from the outward facing image sensors 116, 118 may be used by the processor 108 to construct still images and/or video images of the surrounding environment from the perspective of the device 100.

Additionally or alternatively, in some examples information from outward facing image sensors 116, 118 and/or other sensors may be communicated to a remote computing device 124 responsible for generating and updating a model of the physical space. The HMD device 100 may be communicatively coupled to remote computing device 124 and/or other device(s) via a wired connection or a wireless connection to a network. In some examples, the network may take the form of a local area network (LAN), wide area network (WAN), wired network, wireless network, personal area network, or a combination thereof, and may include the Internet.

Computing device 124 may take the form of a server, networking computer, gaming console, mobile communication device, wearable computing device, desktop computer, laptop computer, tablet computer, set-top box (e.g. cable television box, satellite television box), or any other type of suitable computing device. In some examples, computing device 124 may comprise an embedded system within a larger electronic or mechanical device or system. Additional details regarding the components and computing aspects of the computing device 124 are described in more detail below with respect to FIG. 9.

The position and/or orientation of the HMD device 100 relative to the physical environment may be assessed so that augmented-reality images may be accurately displayed in desired real-world locations with desired orientations. As noted above, the processor 108 may execute instructions to generate a 3D model of the physical environment including surface reconstruction information that may be used to identify surfaces in the physical space. As described in more detail below, such surfaces may include one or more display devices. Such 3D model may be utilized to locate the HMD device 100 and other objects relative to one another.

The IMU 122 of HMD device 100 may be configured to provide position and/or orientation data of the HMD device 100 to the processor 108. In one implementation, the IMU 122 may be configured as a three-axis or three-degree of freedom (3 DOF) position sensor system. This example position sensor system may, for example, include three gyroscopes to indicate or measure a change in orientation of the HMD device 100 within 3D space about three orthogonal axes (e.g., roll, pitch, and yaw). The orientation derived from the sensor signals of the IMU may be used to display, via the see-through display, one or more holographic images with a realistic and stable position and orientation.

In another example, the IMU 122 may be configured as a six-axis or six-degree of freedom (6 DOF) position sensor system. Such a configuration may include three accelerometers and three gyroscopes to indicate or measure a change in location of the HMD device 100 along three orthogonal spatial axes (e.g., x, y, and z) and a change in device orientation about three orthogonal rotation axes (e.g., yaw, pitch, and roll). In some implementations, position and orientation data from the outward fact image sensors 116, 118 and the IMU 122 may be used in conjunction to determine a position and orientation (or 6 DOF pose) of the HMD device 100.

In some examples, the HMD device 100 may display virtual content, such as holographic representations, in a world-locked manner. A world-locked holographic representation appears to be fixed relative to one or more real world objects viewable through the HMD device 100. In this manner, a wearer of the HMD device 100 may move around a real world physical environment while perceiving a world-locked hologram as remaining stationary in a fixed location and orientation relative to the one or more real world objects in the physical environment. In some examples and as described in more detail below, the HMD device 100 may display a world-locked hologram in the form of a notification artifact displayed in world-locked with respect to another display device.

In other examples, the HMD device 100 may operate in a body-locked display mode in which one or more holographic objects may be displayed via the HMD device with body-locked positions. In a body-locked position, a holographic object appears to be fixed relative to the wearer of the HMD device 100, and the body-locked position of the holographic object appears to be moveable relative to real-world objects.

Optical sensor information received from the outward facing image sensors 116, 118 and/or position sensor information received from IMU 122 may be used to assess a position and orientation of the vantage point of the HMD device 100 relative to other real world physical objects. In some embodiments, the position and orientation of the vantage point may be characterized with six degrees of freedom (e.g., world-spate X, Y, Z, pitch, roll, yaw). The vantage point may be characterized globally or independently of the real world physical environment.

The device 100 may also support other suitable positioning techniques, such as GPS or other global navigation systems. Further, while specific examples of position sensor systems have been described, it will be appreciated that any other suitable sensor systems may be used. For example, head position or pose and/or movement data may be determined based on sensor information from any combination of sensors mounted on the HMD device 100 and/or external to the device including, but not limited to, any number of gyroscopes, accelerometers, inertial measurement units, GPS devices, magnetometers, cameras (e.g., visible light cameras, infrared light cameras, time-of-flight depth cameras, structured light depth cameras, etc.), communication devices (e.g., WIFI antennas/interfaces), etc.

The processor 108 may include a logic processor and the HMD device 100 may include volatile memory and non-volatile storage, as discussed in more detail below with respect to FIG. 9, in communication with the at least the partially see-through panels and various sensors of the HMD device 100.

Figure 2:
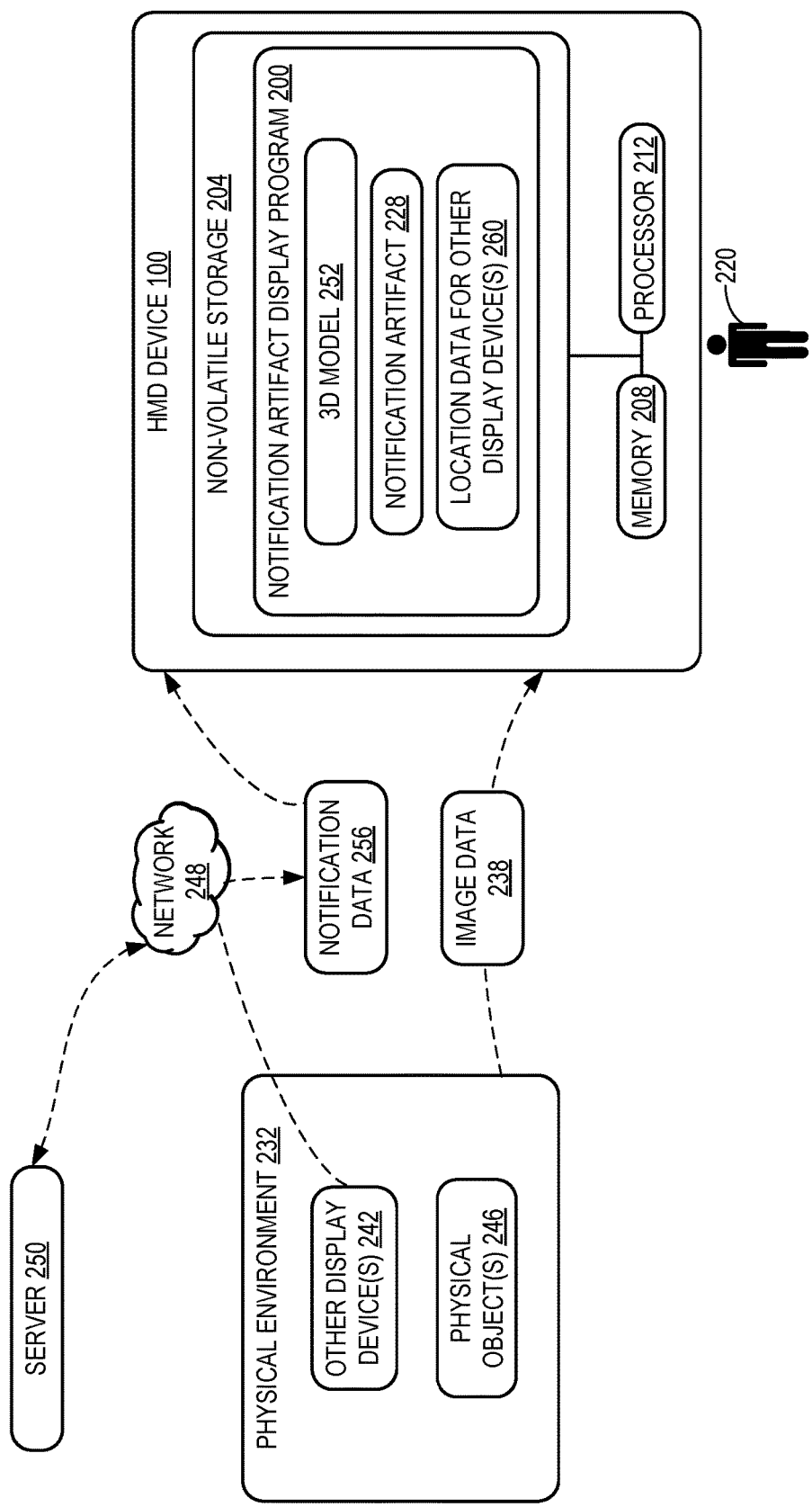
FIG. 2 is a schematic view of the head-mounted display device of FIG. 1 in a physical environment according to an example of the present description.

With reference now to FIGS. 2-7, example use cases illustrating aspects of the present disclosure will now be presented. As schematically shown in FIG. 2, the HMD device 100 may comprise a notification artifact display program 200 stored in non-volatile storage 204. The notification artifact display program 200 may be loaded into memory 208 and its instructions executed by processor 212 to perform one or more of the methods and processes for displaying via a head-mounted display device a notification artifact indicating a notification for another display device as described herein.

In some examples HMD device 100 may display to a user 220 virtual content, such as one or more notification artifacts 228, that appears to be located in physical environment 232. For example and as noted above, the HMD device 100 may receive image data 238 of physical environment 232 in which one or more other display devices 242 and physical objects 246 are located. Using the image data 238, a three dimensional model 252 of at least a portion of the physical environment 232 may be generated.

In some examples, a display device 242 may be communicatively coupled via network 248 to the HMD device 100 and/or to one or more other computing devices, such as server 250. In some examples, network 248 may take the form of a local area network (LAN), wide area network (WAN), wired network, wireless network, personal area network, or a combination thereof, and may include the Internet.

As described in more detail below, the HMD device 100 may generate and/or receive information regarding the display device 242. Examples of such information may include image data 238 of the display device 242, notification data 256 indicating that a notification has issued for the display device 242, and location data 260 for the display device 242, such as position and/or orientation of the display device within the 3D model 252. In some examples such information may be received by the HMD device 100 directly from the display device 242 or from the server 250 via network 248.

Figure 3:
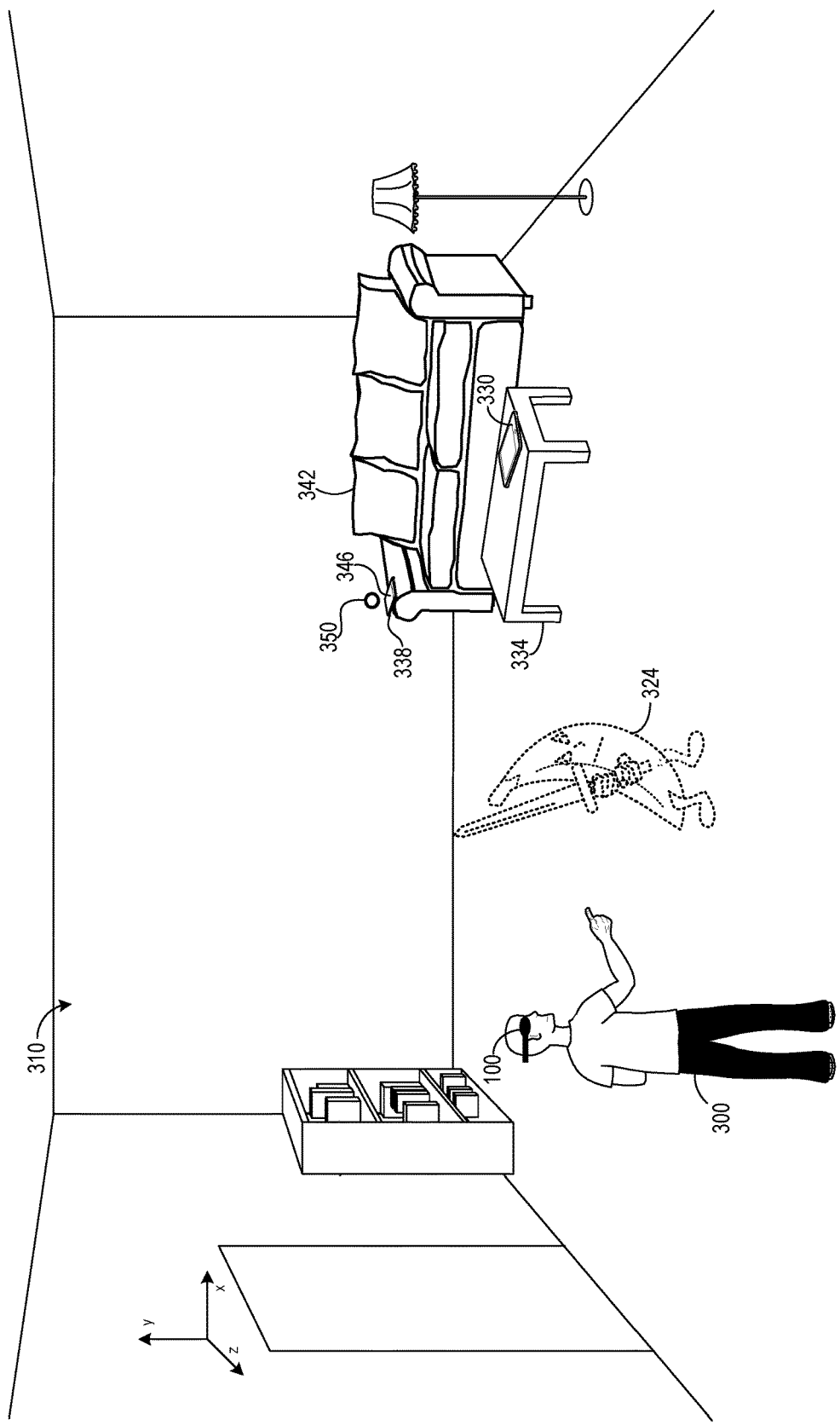
FIG. 3 shows a user wearing the head-mounted display device of FIG. 1 in a room according to an example of the present description.

With reference now to FIG. 3, in one example a user Soren 300 may be standing in room 310 and may wear the HMD device 100 shown in FIGS. 1 and 2 and described above. As noted above, HMD device 100 may comprise an at least partially see-through display configured to visually augment the view of user Soren 300 through the display of the three dimensional physical environment of room 310. In one example, Soren 300 may be playing an augmented reality first person swordplay game. In this game, the HMD device 100 displays to user Soren 300 a holographic sword-wielding banana 324 with which Soren may interact.

A tablet computer 330 belonging to user Soren 300 may be on the coffee table 334. User Soren smartphone 338 may be resting on an arm of the sofa 342. The tablet computer 330 and/or smartphone 338 may be communicatively coupled to the HMD device 100. As described above, HMD device 100 may receive image data of the room 310 including the tablet computer 330 and smartphone 338. Using the image data, the HMD device 100 may generate a 3D model of at least a portion of the room 310. As described above, the HMD device 100 may utilize the image data and/or other sensor data to determine a location of the HMD device within the 3D model. Image data also may be used to determine a location of the tablet computer 330 and/or smartphone 338 within the 3D model of the room 310.

In one example, while user Soren is playing the first person swordplay game, his smartphone 338 receives a text message from his spouse. The smartphone 338 displays the text message on a display 346 of the smartphone. User Soren 300 may not see the text message or otherwise notice that the message has arrived on his smartphone 338. As the HMD device 100 is communicatively coupled to smartphone 338, the HMD device may receive notification data indicating that a text message has arrived for the smartphone. For example, the HMD device 100 may receive such notification data directly from the smartphone 338 via a wireless connection, such as using the Bluetooth wireless protocol. In another example, the HMD device 100 may receive such notification data from a third party source, such as a remote server hosting user Soren's messaging service provider.

Based on receiving the notification data, and using the location of the smartphone 338 relative to the HMD device 100 within the 3D model, the HMD device may display a notification artifact adjacent to the smartphone that signals to user Soren 300 that a text message has been received by the smartphone. In the example of FIG. 3, the notification artifact takes the form of a virtual bubble 350 that is displayed in a world-locked manner to hover above the smartphone 338. In this manner, as user Soren 300 moves about the room 310, the holographic bubble 350 appears to float in a fixed location above the smartphone. In other examples, the notification artifact may take a variety of other shapes and forms, such as an arrow pointing to the phone, an exclamation point, an avatar, any other shape, character, and/or indicia displayed adjacent to the smartphone, a color or glow emanating from the phone, etc., as well as any combination of the foregoing.

In this manner and in one potential advantage of the present disclosure, user Soren 300 is enabled to quickly and easily learn that a text messages has arrived. For example, from any location in the room Soren 300 may simply glance in the direction of his smartphone 388 and see the small virtual bubble 350 that indicates receipt of a text message. Further, providing a notification in this non obtrusive manner may enhance user Soren's enjoyment of the swordplay game by not distracting him unnecessarily from the game, and enabling him to easily ascertain the notification by just quickly glancing in the direction of his smartphone 338.

In some examples, the HMD device 100 may be triggered to display the notification artifact as described above solely based on receiving notification data indicating that the text message has issued for the smartphone 338. In this manner, as soon as the notification data is received, the HMD device 100 may display the notification artifact.

In other examples, after such notification data is received, the HMD device 100 may delay the display of the notification artifact until a separate trigger event occurs. In one example, such a trigger event may comprise the user Soren 300 gazing at his smartphone 338. For example, while user Soren 300 is intensely battling the sword-wielding banana 324, the HMD device 100 may receive the notification data indicating that the text message has issued for his smartphone 338. At this point, the HMD device 100 may not immediately display the virtual bubble 350.

After several minutes, user Soren 300 defeats the banana 324, steps back to catch his breath, and looks over to his smartphone 338. The HMD device 100 may determine that user Soren 300 is gazing at the smartphone 338. Based on determining that user Soren 300 is gazing at the smartphone 338, the HMD device 100 is triggered to display the virtual bubble 350 hovering above the smartphone 338. In this manner, any distraction that may be caused by the display of the virtual bubble 350 is avoided by withholding the display of the bubble until user Soren 300 gazes at the smartphone 338.

Figure 4:
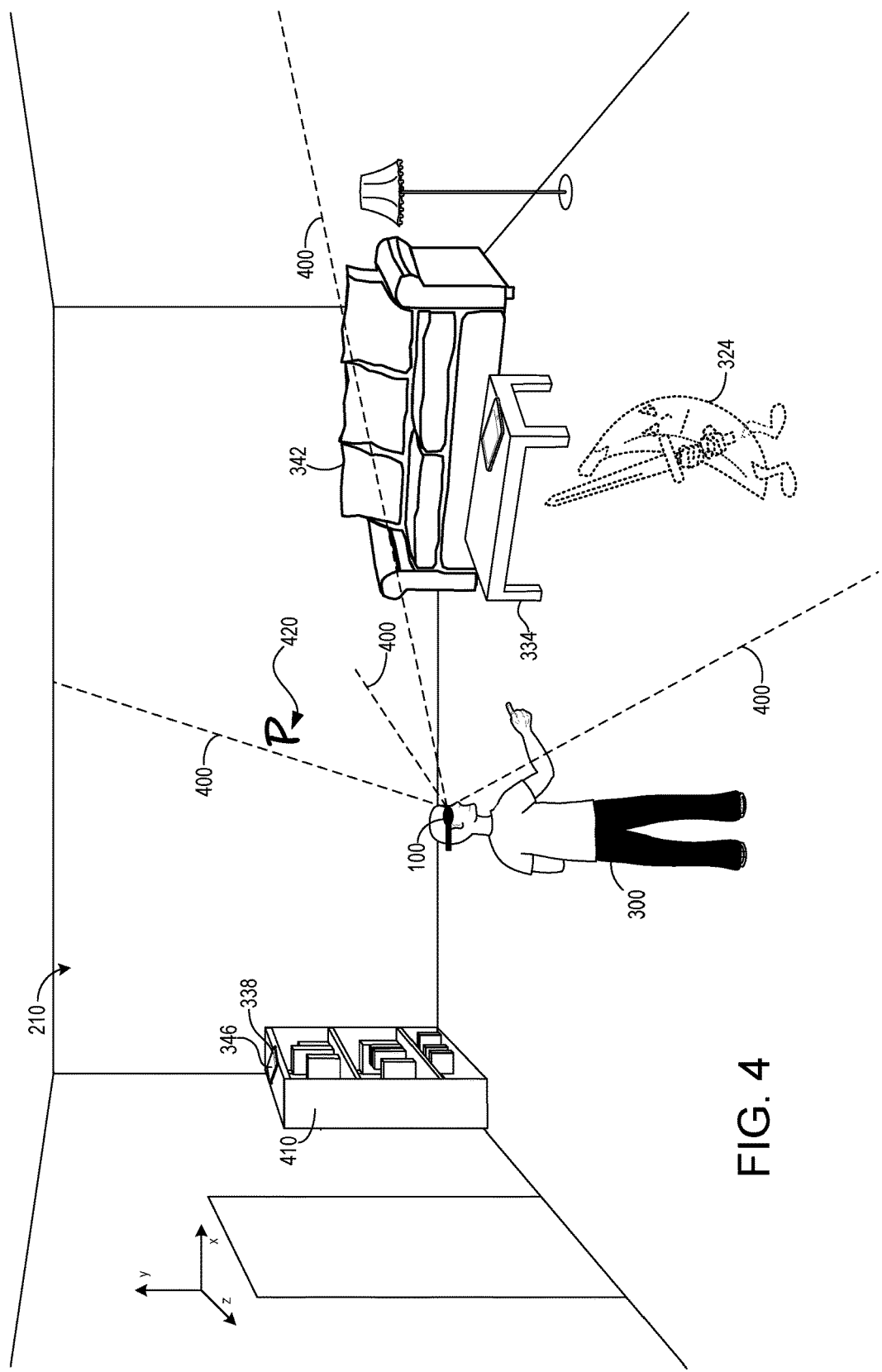
FIG. 4 shows a user wearing the head-mounted display device of FIG. 1 in a room according to another example of the present description.

With reference now to FIG. 4, in some examples the HMD device 100 may provide a field of view, indicated by dotted lines 400, that defines a volume of space in which user Soren 300 may view virtual content displayed by the device. In different examples of HMD devices 100, the field of view may have different shapes, such as cone-shaped, frustum-shaped, pyramid-shaped, or any other suitable shape. In different examples of HMD devices 100, the field of view also may have different sizes that occupy different volumes of space.

In the example of FIG. 4, user Soren's smartphone 338 is on the bookcase 410 and is not within the field of view 400. The HMD device 100 may receive notification data indicating that an incoming phone call is being received by the smartphone 338. In this example, because the smartphone 338 is not within the field of view 400, the HMD device 100 may display a notification artifact at a boundary location of the field of view 400 that indicates the location of the smartphone. In the example of FIG. 4, the notification artifact is a holographic letter "P", which may designate "Phone Call", and is displayed at a boundary location 420 of the field of view 400. In this example the boundary location 420 indicates the location of the smartphone 338 to user Soren 300 by being located in the current field of view 400 on the left side of Soren and at an elevation similar to the elevation of the smartphone. In this manner, from his current location and orientation in the room 210, and by seeing the notification artifact "P" at a left boundary of his current field of view 400, user Soren 300 may be alerted that a notification (in this case, an incoming phone call) is issuing for his smartphone 338, and also informed that his smartphone 338 is located to his left.

Figure 5:
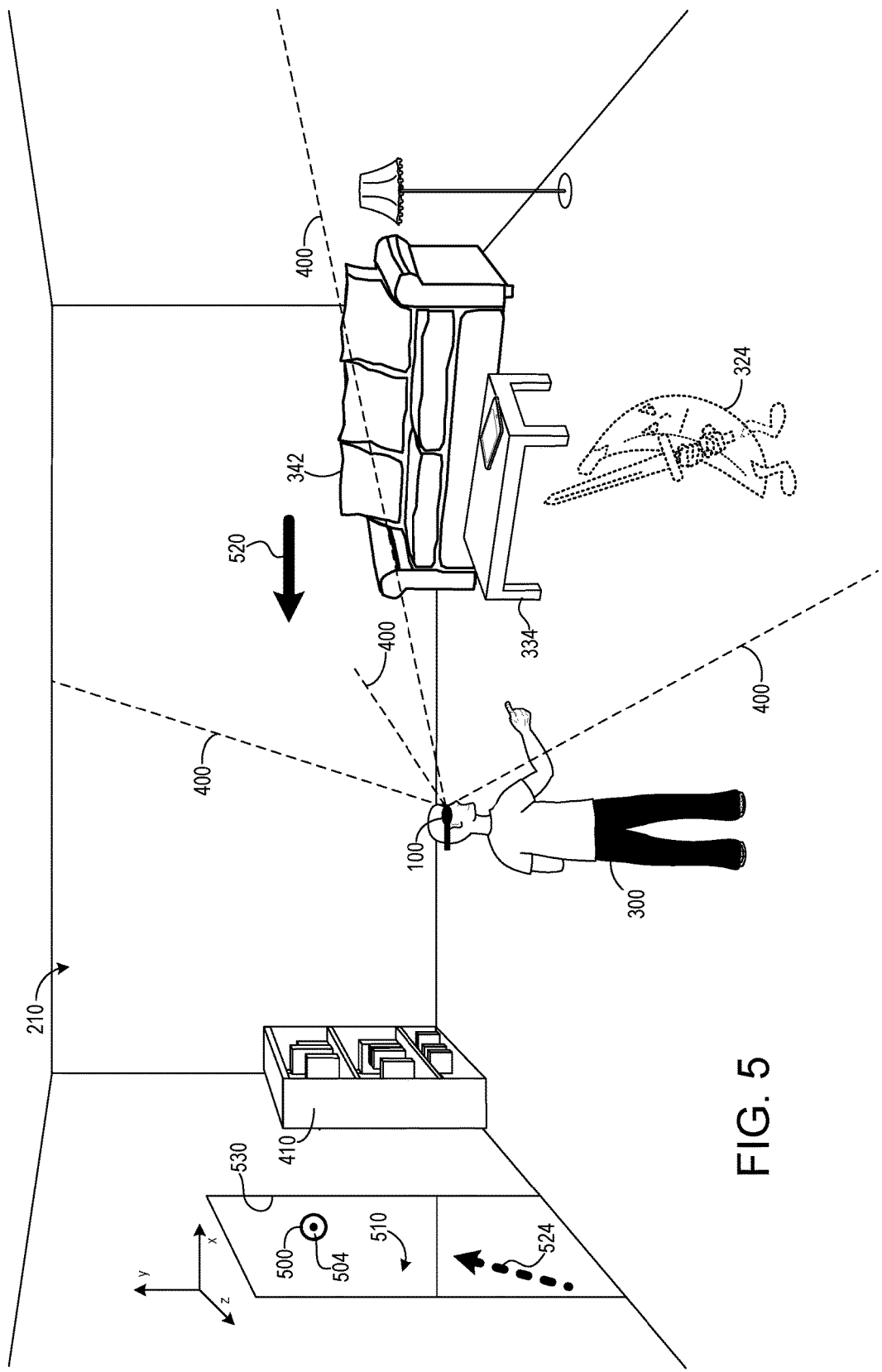
FIG. 5 shows a user wearing the head-mounted display device of FIG. 1 in a room according to another example of the present description.

With reference now to FIG. 5, in some examples the notification artifact comprises a directional indicator that points toward the location of the other display device. In the example of FIG. 5, a smart thermostat 500 having display 504 is located in another room 510 that adjoins the room 210. User Soren 300 cannot see the smart thermostat 500 within his current field of view 400.

In this example, the HMD device 100 may receive notification data indicating that the smart thermostat 500 has detected a problem with the furnace of the house. In such a situation, the smart thermostat 500 displays a warning message on its display 504. In this example, because the smart thermostat 500 is not within the field of view 400, the HMD device 100 may display a directional indicator in the form of an arrow 520 that points toward the location of the smart thermostat 500 in the other room 510. In this manner, from his current location and orientation in the room 210, and by seeing the arrow 520 in his current field of view 400, user Soren 300 may be alerted that a notification is issuing for another device, and also may be guided to proceed in a direction toward the smart thermostat 500 in the next room 510.

Upon seeing the arrow 520, user Soren 300 may turn to his left and begin walking toward the other room 510. In some examples, as user Soren 300 moves and the location of the HMD device 100 and its field of view 400 change correspondingly, the arrow may be modified to continue to point toward the location of the smart thermostat 500. For example, where user Soren 300 turns to face the doorway 530 and begins walking toward the other room 510, the arrow may be modified to be displayed in the other room and pointing upwardly toward the smart thermostat 500, as indicated by dashed arrow 524. In some examples, as the location of the HMD device 100 changes, a directional indicator may be continuously updated to point toward the fixed location of the other display device.

Figure 6:
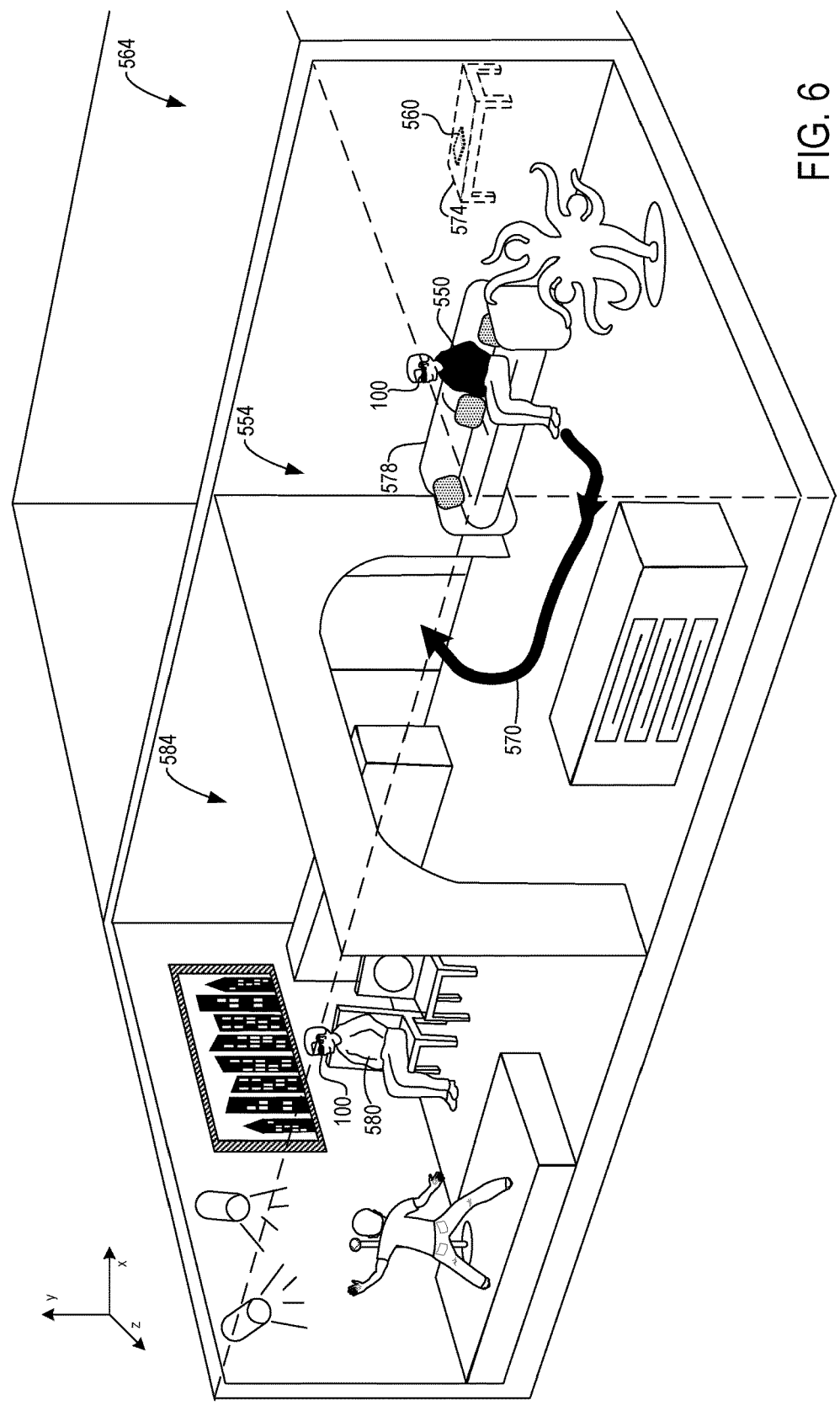
FIG. 6 shows a user wearing the head-mounted display device of FIG. 1 in a lobby according to another example of the present description.

With reference now to FIG. 6, in some examples the HMD device 100 may display a notification artifact in the form of a route through at least a portion of the physical environment in which the HMD device is located. The route may show a direction of travel to the location of the other display device. In the example of FIG. 6, a user Paul 550 is wearing HMD device 100 and sitting in a hotel lobby 554. User Paul 550 may have inadvertently left his tablet computer 560 in the banquet hall 564 next to the lobby 554. User Paul 550 also may be playing a casual role playing game with his tablet computer 560 that occasionally needs his attention.

The HMD device 100 may receive notification data indicating that the role playing game has issued a notification for Paul. In this example, because the tablet computer 560 is located in the banquet hall 564, the HMD device 100 may display a notification artifact in the form of a route through the hotel lobby 554 that guides user Paul 550 to the location of his tablet computer 560. In this example, the route takes the form of an arrowed path 570 displayed by HMD device 100 to appear on the floor of the hotel. In some examples, when user Paul 550 begins following the displayed path 570 and moving through the lobby along the path, the HMD device 100 may update and modify the path 570 based on Paul's changing location to lead Paul to his tablet computer 560.

In some examples, the path 570 may be generated by HMI device 100 at least from data collected by the HMD device at the location of the other display device. For example and as noted above, user Paul may have left his tablet computer 560 on a table 574 in the banquet hall 564 while wearing the HMD device 100. Image data of the tablet computer 560 resting on the table 574 along with location data of Paul's subsequent walking route to the couch 578 may have been collected by Paul's HMD device 100. Using at least this data, the HMD device 100 may generate the path 570 that leads from Paul's current position shown in FIG. 6 back to the tablet computer 560.

In some examples, location data of the tablet computer 560 may be received by HMD device 100 from one or more other sources. In one example, user Paul's friend Martin 580 may be wearing an HMD device 100 and may have previously walked past Paul's tablet computer 560 in the banquet hall 564 on his way to the lounge 584. In passing by the tablet computer 560, Martin's HMD device 100 may have collected geo-located image data of the tablet computer. Martin's HMD device 100 also may have identified the tablet computer 560 as belonging to his friend Paul 550, such as via image data shoving the tablet computer, an identification beacon broadcast by the tablet computer, or any other suitable method. Using this information, Martin's HMD device 100 may send to user Paul's HMD device 100 location data indicating the location of the tablet computer 560 in the banquet hall 564.

Figure 7:
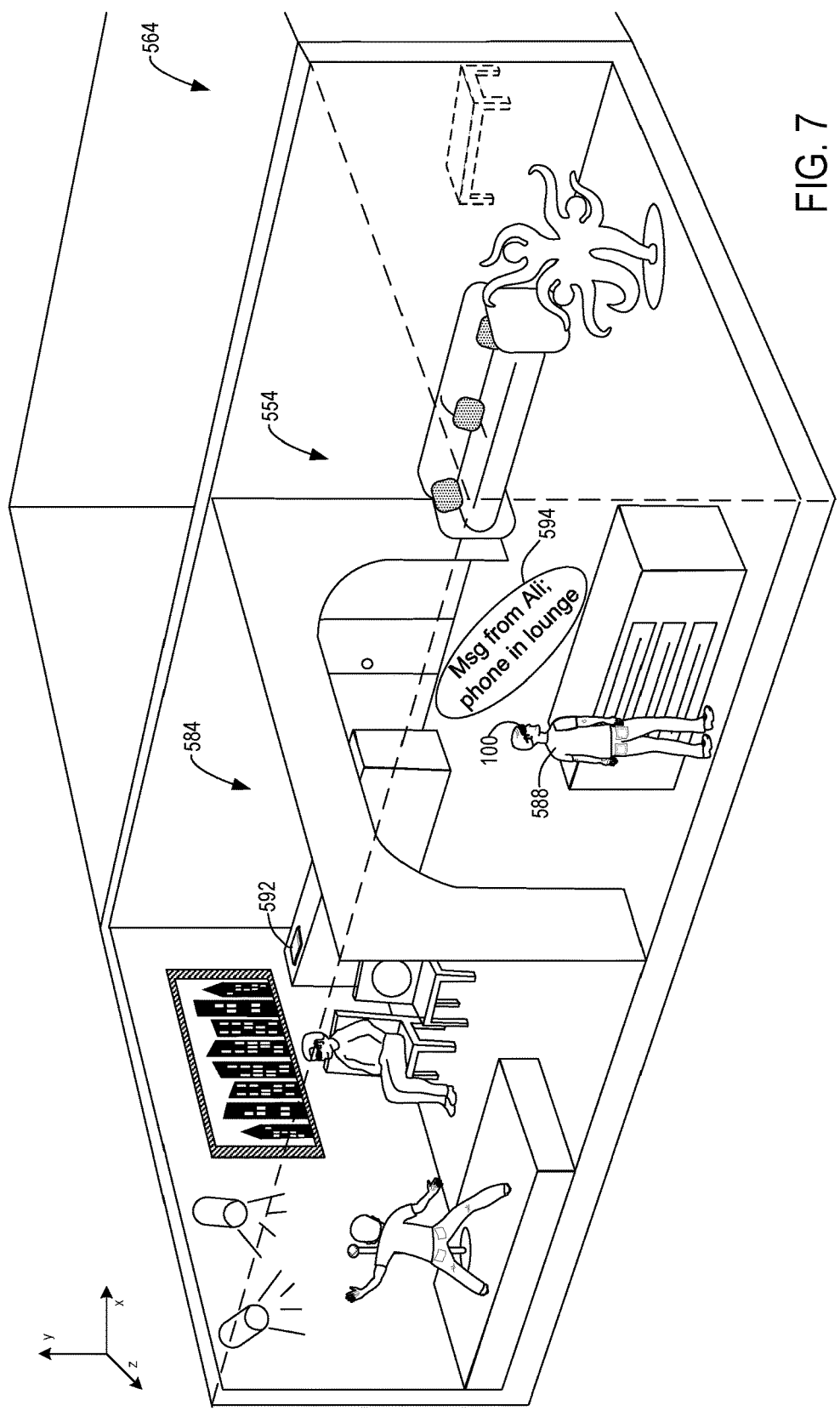
FIG. 7 shows another user wearing the head-mounted display device of FIG. 1 in a lobby according to another example of the present description.

With reference now to FIG. 7, in some examples the notification artifact may comprise textual location information indicating the location of the other display device. In the example of FIG. 7, hotel clerk Henri 588 may wear HMD device 100 and may have left his smartphone 592 in the lounge 584. Henri's HMD device 100 may receive notification data indicating that a text message from his friend Ali has been received by his smartphone 592. The HMD device 100 also may determine that Henri's smartphone 592 is located in the lounge 584. In this example, Henri's HMD device 100 may display a holographic text field 594 that reads "Msg from Ali; phone in lounge." In this manner, Henri may be unobtrusive apprised that his smartphone 592 has received a message from his friend Ali, and that his smartphone is located in the lounge 584.

Figure 8A:
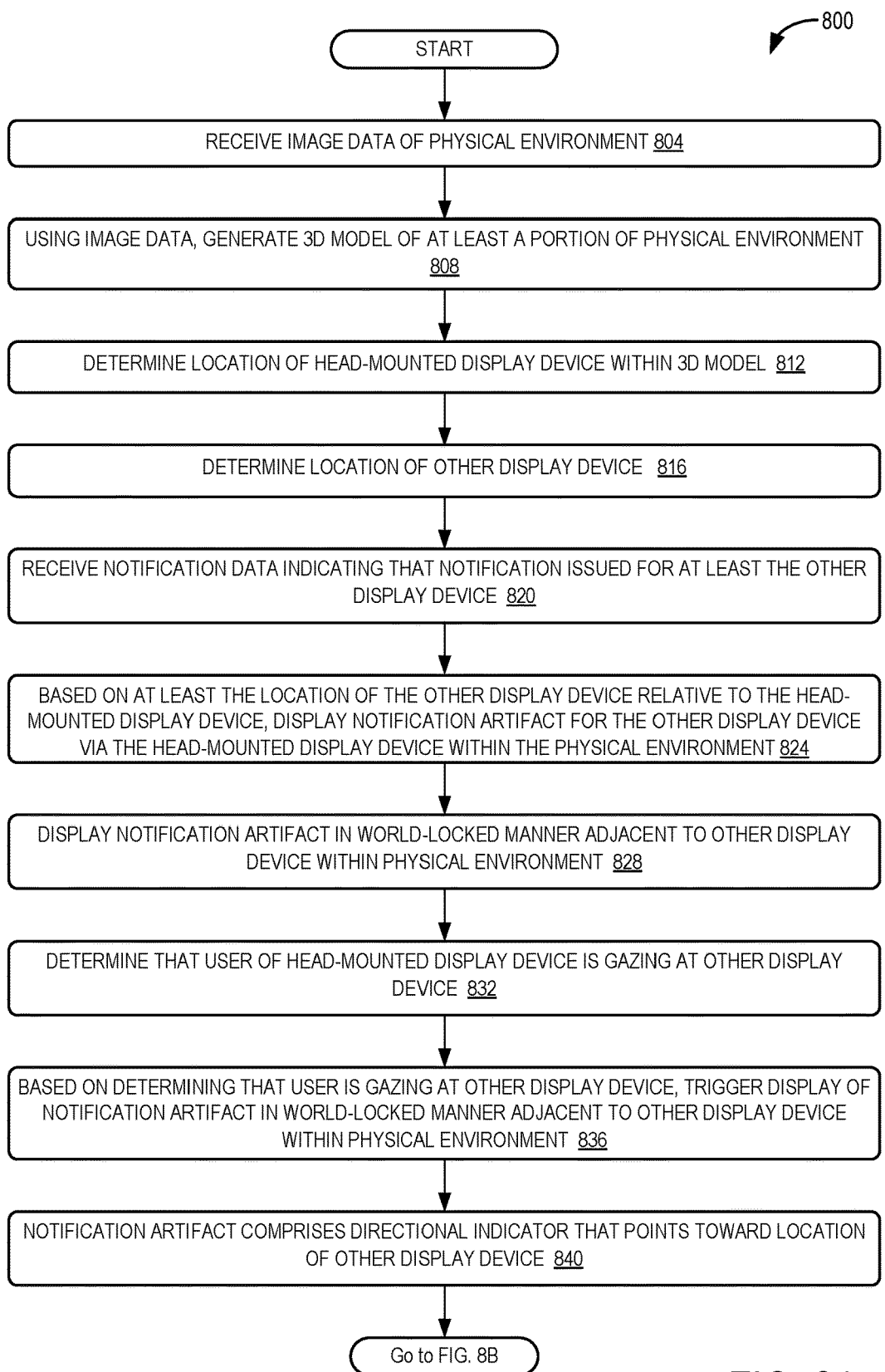
FIGS. 8A and 8B are a flow chart of a method for displaying a notification artifact indicating a notification carrier for another display device according to examples of the present description.
Figure 8B:
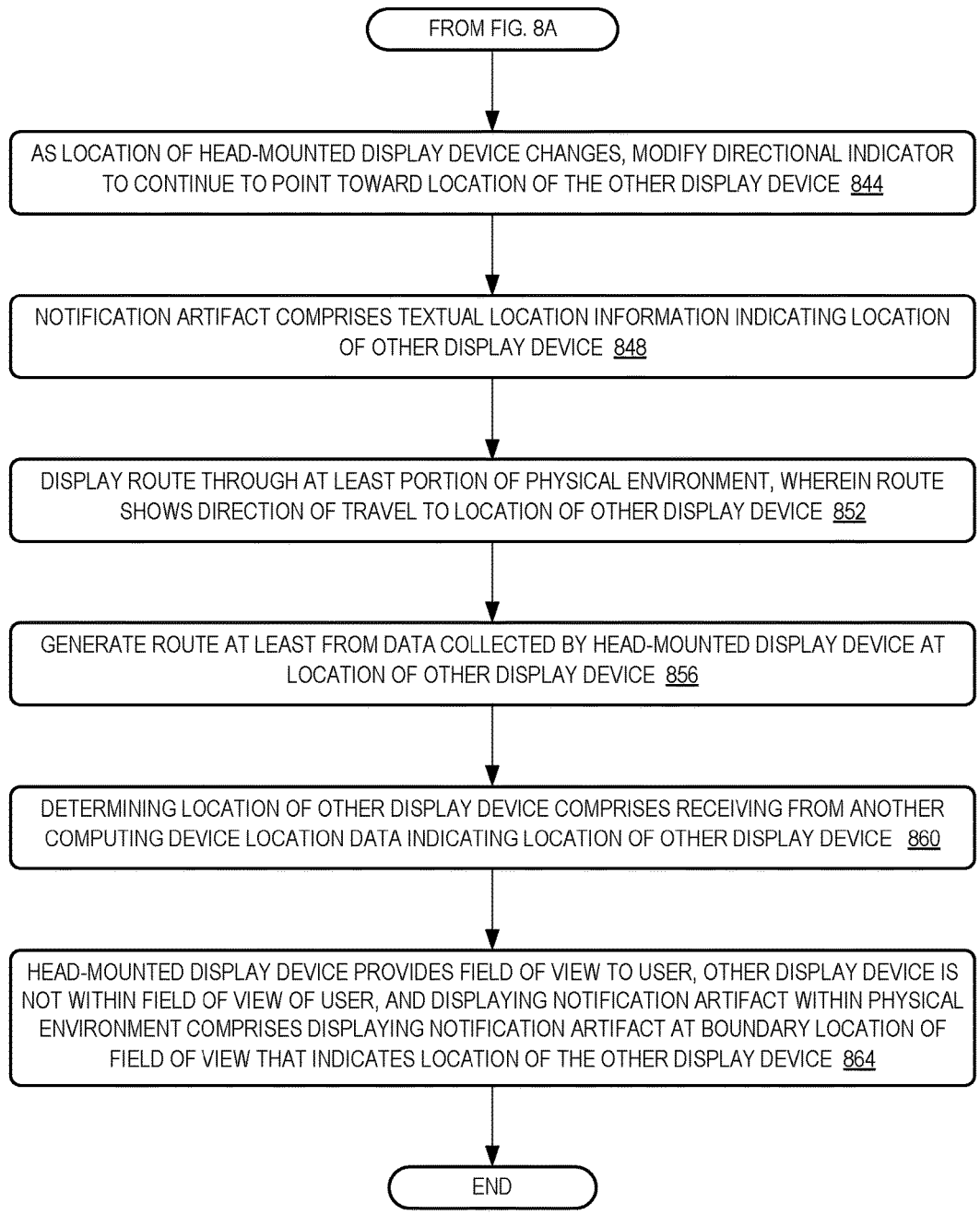

FIGS. 8A and 8B illustrate a flow chart of a method 800 for displaying via a head-mounted display device a notification artifact indicating a notification for another display device according to an example of the present disclosure. The following description of method 800 is provided with reference to the software and hardware components described above and shown in FIGS. 1-7. It will be appreciated that method 800 also may be performed in other contexts using other suitable hardware and software components.

With reference to FIG. 8A, at 804 the method 800 may include receiving image data of a physical environment. At 808 the method 800 may include using the image data, generating a three dimensional model of at least a portion of the physical environment. At 812 the method 800 may include determining location of the head-mounted display device within the three dimensional model. At 816 the method 800 may include determining a location of the other display device. At 820 the method 800 may include receiving notification data indicating that a notification issued for at least the other display device. At 824 the method 800 may include, based on at least the location of the other display device relative to the head-mounted display device, displaying the notification artifact for the other display device via the head-mounted display device within the physical environment.

At 828 the method 800 may include, wherein displaying the notification artifact via the head-mounted display device comprises displaying the notification artifact in a world-locked manner adjacent to the other display device within the physical environment. At 832 the method 800 may include determining that a user of the head-mounted display device is gazing at the other display device. At 836 the method 800 may include, based on determining that the user is gazing at the other display device, triggering the display of the notification artifact in a world-locked manner adjacent to the other display device within the physical environment.

At 840 the method 800 may include wherein the notification artifact comprises a directional indicator that points toward the location of the other display device. With reference now to FIG. 8B, at 844 the method 800 may include, as the location of the head-mounted display device changes, modifying the directional indicator to continue to point toward the location of the other display device. At 848 the method 800 may include wherein the notification artifact comprises textual location information indicating the location of the other display device. At 852 the method 800 may include wherein displaying the notification artifact within the physical environment comprises displaying a route through at least the portion of the physical environment, wherein the route shows a direction of travel to the location of the other display device.

At 856 the method 800 may include generating the route at least from data collected by the head-mounted display device at the location of the other display device. At 860 the method 800 may include wherein determining the location of the other display device comprises receiving from another computing device location data indicating the location of the other display device. At 864 the method 800 may include, wherein the head-mounted display device provides a field of view to a user and the other display device is not within the field of view, displaying the notification artifact at a boundary location of the field of view that indicates the location of the other display device.

It will be appreciated that method 800 is provided by way of example and is not meant to be limiting. Therefore, it is to be understood that method 800 may include additional and/or alternative steps relative to those illustrated in FIGS. 8A and 8B. Further, it is to be understood that method 800 may be performed in any suitable order. Further still, it is to be understood that one or more steps may be omitted from method 800 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
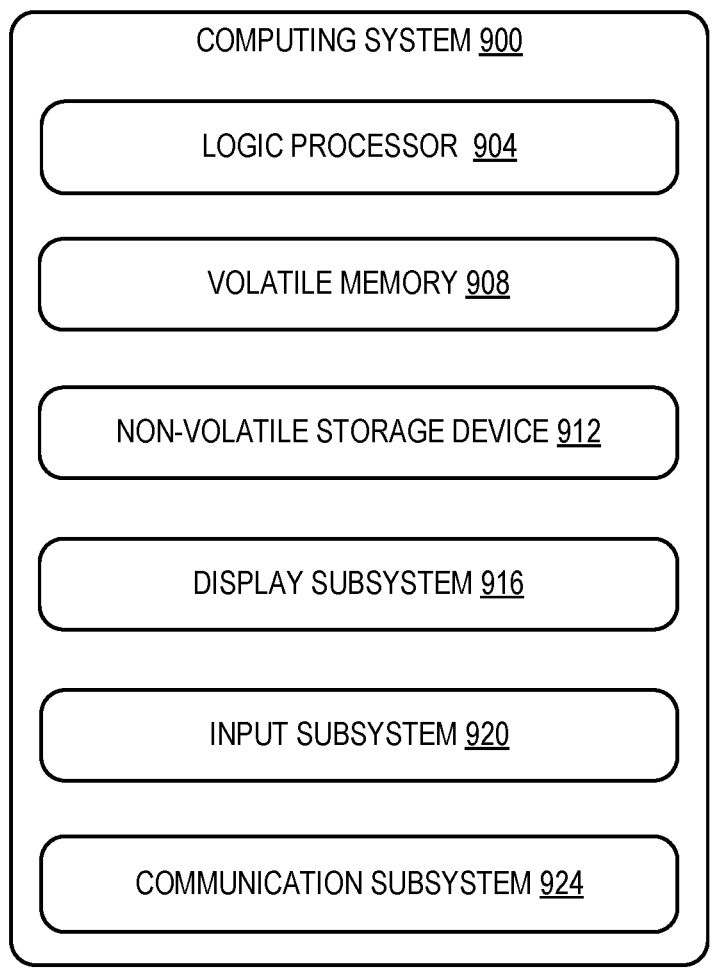
FIG. 9 shows a computing system according an example of the present description.

FIG. 9 schematically shows a non-limiting embodiment of a computing system 900 that can enact one or more of the methods and processes described above. Computing system 900 is shown in simplified form. Computing system 900 may take the form of computing device 124 shown in FIG. 1, server 250 shown in FIG. 2, and/or one or more other devices integrated in or otherwise communicatively coupled with head-mounted display device 100 (e.g., personal computers, server computers, tablet computers, home-entertainment computers, network computing devices, gaming devices, mobile computing devices, mobile communication devices (e.g., smartphone), and/or other computing devices).

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 9.

Logic processor 904 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic processor 904 executing instructions held by non-volatile storage device 912, using portions of volatile memory 908. It will be understood that different programs may be instantiated from the same application, service, code block, object, library, routine, API function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure. With respect to the example HMD device 100 of FIG. 1, the display panels 104R and 104L configured to visually augment an appearance if a real-word, three dimensional physical environment by displaying virtual objects such as holograms are an example of a display subsystem 916.

When included, input subsystem 920 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; any of the sensors described above with respect to HMD device 100; and/or any other suitable sensor.

When included, communication subsystem 924 may be configured to communicatively couple computing system 900 with one or more other computing devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a method for displaying via a head-mounted display device a notification artifact indicating a notification for another display device, the method comprising: receiving image data of a physical environment; using the image data, generating a three dimensional model of at least a portion of the physical environment; determining a location of the head-mounted display device within the three dimensional model; determining a location of the other display device; receiving notification data indicating that the notification issued for at least the other display device; and based on at least the location of the other display device relative to the head-mounted display device, displaying the notification artifact for the other display device via the head-mounted display device within the physical environment. The method may additionally or optionally include, wherein displaying the notification artifact via the head-mounted display device comprises displaying the notification artifact in a world-locked manner adjacent to the other display device within the physical environment. The method may additionally or optionally include, determining that a user of the head-mounted display device is gazing at the other display device; and based on determining that the user is gazing at the other display device, triggering the display of the notification artifact in a world-locked manner adjacent to the other display device within the physical environment. The method may additionally or optionally include, wherein the notification artifact comprises a directional indicator that points toward the location of the other display device. The method may additionally or optionally include, as the location of the head-mounted display device changes, modifying the directional indicator to continue to point toward the location of the other display device. The method may additionally or optionally include, wherein the notification artifact comprises textual location information indicating the location of the other display device. The method may additionally or optionally include, wherein displaying the notification artifact within the physical environment comprises displaying a route through at least the portion of the physical environment, wherein the route shows a direction of travel to the location of the other display device. The method may additionally or optionally include, further comprising generating the route at least from data collected by the head-mounted display device at the location of the other display device. The method may additionally or optionally include, wherein determining the location of the other display device comprises receiving from another computing device location data indicating the location of the other display device. The method may additionally or optionally include, wherein the head-mounted display device provides a field of view to a user, the other display device is not within the field of view, and displaying the notification artifact within the physical environment further comprises displaying the notification artifact at a boundary location of the field of view that indicates the location of the other display device.

Another aspect provides a head-mounted display device, comprising: an at least partially see-through display; a processor; and a memory holding instructions executable by the processor to: receive image data of a physical environment; using the image data, generate a three dimensional model of at least a portion of the physical environment; determine a location of the head-mounted display device within the three dimensional model; determine a location of another display device; receive notification data indicating that a notification issued for at least the other display device; and based on at least the location of the other display device relative to the head-mounted display device, display the notification artifact for the other display device within the physical environment via the at least partially see-through display. The head-mounted display device may additionally or alternatively include, wherein displaying the notification artifact comprises displaying the notification artifact in a world-locked manner adjacent to the other display device within the physical environment. The head-mounted display device may additionally or alternatively include, wherein the instructions are executable by the processor to: determine that a user of the head-mounted display device is gazing at the other display device; and based on determining that the user is gazing at the other display device, trigger the display of the notification artifact in a world-locked manner adjacent to the other display device within the physical environment. The head-mounted display device may additionally or alternatively include, wherein the notification artifact comprises a directional indicator that points toward the location of the other display device. The head-mounted display device may additionally or alternatively include, wherein the instructions are executable by the processor to modify the directional indicator to continue to point toward the location of the other display device as the location of the head-mounted display device changes. The head-mounted display device may additionally or alternatively include, wherein the notification artifact comprises textual location information indicating the location of the other display device. The head-mounted display device may additionally or alternatively include, wherein displaying the notification artifact within the physical environment comprises displaying a route through at least the portion of the physical environment, wherein the route shows a direction of travel to the location of the other display device. The head-mounted display device may additionally or alternatively include, wherein the instructions are executable by the processor to generate the route at least in part from data collected by the head-mounted display device at the location of the other display device. The head-mounted display device may additionally or alternatively include, wherein the instructions are executable by the processor to provide a field of view to a user, the other display device is not within the field of view, and displaying the notification artifact within the physical environment further comprises displaying the notification artifact at a boundary location of the field of view that indicates the location of the other display device.

Another aspect provides method for displaying via a head-mounted display device a notification artifact indicating a notification for another display device, the method comprising: receiving image data of a physical environment; using the image data, generating a three dimensional model of at least a portion of the physical environment; determining a location of the head-mounted display device within the three dimensional model; determining a location of the other display device within the three dimensional model; receiving notification data indicating that the notification issued for at least the other display device; and based on at least the location of the other display device relative to the head-mounted display device, displaying via the head-mounted display device the notification artifact for the other display device within the physical environment, wherein the notification artifact comprises a route through at least the portion of the physical environment that shows a direction of travel to the location of the other display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. At a head-mounted display device, a method for displaying via the head-mounted display device a notification artifact indicating a notification for another display device, the method comprising:
   receiving image data of a physical environment;
   using the image data, generating a three dimensional model of at least a portion of the physical environment;
   determining a location of the head-mounted display device within the three dimensional model;
   determining a location of the other display device that is outside a field of view of the head-mounted display device;
   receiving notification data indicating that the notification issued for at least the other display device; and
   based on at least the location of the other display device being outside the field of view of the head-mounted display device, displaying the notification artifact for the other display device at a boundary location of the field of view of the head-mounted display device that indicates the location of the other display device via the head-mounted display device within the physical environment.

2. The method of claim 1, wherein displaying the notification artifact via the head-mounted display device comprises displaying the notification artifact in a world-locked manner adjacent to the other display device within the physical environment.

3. The method of claim 1, further comprising:
   determining that a user of the head-mounted display device is gazing at the other display device; and
   based on determining that the user is gazing at the other display device, triggering the display of the notification artifact in a world-locked manner adjacent to the other display device within the physical environment.

4. The method of claim 1, wherein the notification artifact comprises a directional indicator that points toward the location of the other display device.

5. The method of claim 4, further comprising, as the location of the head-mounted display device changes, modifying the directional indicator to continue to point toward the location of the other display device.

6. The method of claim 1, wherein the notification artifact comprises textual location information indicating the location of the other display device.

7. The method of claim 1, wherein displaying the notification artifact within the physical environment comprises displaying a route through at least the portion of the physical environment, wherein the route shows a direction of travel to the location of the other display device.

8. The method of claim 7, further comprising generating the route at least from data collected by the head-mounted display device at the location of the other display device.

9. The method of claim 1, wherein determining the location of the other display device comprises receiving from another computing device location data indicating the location of the other display device.

10. A head-mounted display device, comprising:
a see-through display;
a processor; and
a memory holding instructions executable by the processor to:
receive image data of a physical environment;
using the image data, generate a three dimensional model of at least a portion of the physical environment;
determine a location of the head-mounted display device within the three dimensional model;
determine a location of another display device that is outside a field of view of the head-mounted display device;
receive notification data indicating that a notification issued for at least the other display device; and
based on at least the location of the other display device being outside the field of view of the head-mounted display device, display a notification artifact for the other display device within the physical environment via the at least partially see-through display, the notification artifact displayed at a boundary location of the field of view of the head-mounted display device that indicates the location of the other display device.

11. The head-mounted display device of claim 10, wherein displaying the notification artifact comprises displaying the notification artifact in a world-locked manner adjacent to the other display device within the physical environment.

12. The head-mounted display device of claim 10, wherein the instructions are executable by the processor to:
determine that a user of the head-mounted display device is gazing at the other display device; and
based on determining that the user is gazing at the other display device, trigger the display of the notification artifact in a world-locked manner adjacent to the other display device within the physical environment.

13. The head-mounted display device of claim 10, wherein the notification artifact comprises a directional indicator that points toward the location of the other display device.

14. The head-mounted display device of claim 13, wherein the instructions are executable by the processor to modify the directional indicator to continue to point toward the location of the other display device as the location of the head-mounted display device changes.

15. The head-mounted display device of claim 10, wherein the notification artifact comprises textual location information indicating the location of the other display device.

16. The head-mounted display device of claim 10, wherein displaying the notification artifact within the physical environment comprises displaying a route through at least the portion of the physical environment, wherein the route shows a direction of travel to the location of the other display device.

17. The head-mounted display device of claim 16, wherein the instructions are executable by the processor to generate the route at least in part from data collected by the head-mounted display device at the location of the other display device.

18. At a head-mounted display device, a method for displaying via the head-mounted display device a notification artifact indicating a notification for another display device, the method comprising:
receiving image data of a physical environment;
using the image data, generating a three dimensional model of at least a portion of the physical environment;
determining a location of the head-mounted display device within the three dimensional model;
determining a location of the other display device within the three dimensional model;
receiving notification data indicating that the notification issued for at least the other display device; and
based on at least the location of the other display device relative to the head-mounted display device, displaying via the head-mounted display device the notification artifact for the other display device within the physical environment, wherein the notification artifact comprises a route through at least the portion of the physical environment that shows a direction of travel to the location of the other display device.

* * * * *